ated Nov. 29, 1966

3,288,747
MOLDING COMPOSITION OF POWDERED EPOXY RESIN, AND FILLER COATED WITH NORMALLY SOLID CURING AGENT
Vincent Sussman, Roseland, N.J., assignor, by mesne assignments, to Allied Products Corporation, Chicago, Ill., a corporation of Michigan
No Drawing. Filed June 8, 1962, Ser. No. 200,924
16 Claims. (Cl. 260—37)

The invention relates to epoxy resin compositions, and is more particularly directed to compositions of epoxy resin, curing agent and filler in a novel relationship, and to methods for preparing such compositions.

Epoxy resin molding compositions when set or cured are known to exhibit excellent electrical insulating properties and good physical properties, such as high impact resistance and low moisture absorption. One of the basic problems however, has been the attainment of a composition including the curing agent, which will cure rapidly and uniformly, and still be stable and not set up or cure when stored at room temperature for an extended period of time.

In Bolstad Patent 2,866,768, granted December 30, 1958, it has been proposed to provide a rapidly curing epoxy resin composition which will not set up or cure when stored for a substantial period at room temperature. Such prior art composition however, tends to advance in flow properties to a gel state when stored at 90° to 100° F. within two (2) to five (5) days. Temperatures of 90° F. are not uncommon in molding plants and in various parts of the country through which the composition must be transported in shipping. Moreover, epoxy resin molding compositions as disclosed in the prior art become rubbery in the mold when cured in one (1) to three (3) minutes at the recommended curing temperatures. This may cause rupture of products having walls of thin section upon ejection from the mold.

The primary object of the invention is to provide novel compositions which comprise an epoxy resin, filler and curing agent for the resin in such relationship that, though the compositions are ready for molding without further agitation or mixing, premature interaction of the resin and curing agent is prevented, though the compositions may have been stored at temperatures as high as 90° to 100° F. for a period as long as three (3) months. At a room temperature of approximately 77° F., the compositions of the invention possess a storage life of a year or longer. Furthermore, the long shelf-life compositions of the invention are extremely fast curing at the usual molding temperatures of approximately 250° to 350° F., setting hard within one (1) minute or less, and as rapidly as ten (10) seconds.

Another object of the invention is to provide a shaped or preformed article comprising an epoxy resin, filler and curing agent having the unusually long shelf-life and fast curing properties as aforesaid, coupled with the preform being capable of forming a melt or solution and curing upon the application of heat alone, that is, without necessitating agitation or the application of pressure to the melt.

A further object of the invention is to provide compositions of an epoxy resin, filler and curing agent in dry form, either a powder or a tablet or preform made of the powder, having the unusually long shelf-life at elevated temperatures and fast curing properties as aforesaid, the dry form of the composition in powder or tableted form facilitating handling of predetermined measured amounts of the composition for a variety of applications or uses.

Still another object of the invention is to provide novel methods for preparing compositions of the character described.

These, and other objects and advantages of the invention will be apparent from the following detailed description of several preferred embodiments of the invention.

The molding compositions of the invention comprise a solid polyfunctional epoxy resin having a melting point in the range of 130° to 340° F., a curing agent having a melting point in the range of approximately 120° to 340° F., a filler, and preferably an accelerator. The accelerator may be omitted.

I have found that by incorporating a substantial part or all of the curing agent in mixture with separate or discrete, solid particles of the epoxy resin in a particular manner, namely, by making the filler particles serve as a carrier for the curing agent, compositions are obtained which are stable up to 90° to 100° F. for as long as three (3) months, and yet will cure in less than a minute when subjected to the usual molding temperatures. When the curing agent is carried by the filler in the form of a surface coating or film upon the individual filler particles, the curing agent is distributed to furnish a greatly increased and very substantial surface area of curing agent for reaction readily with the resin particles. As a result, a composition is provided which, upon curing, is uniform or homogeneous, that is, the cured product is free of hardener-rich and resin-rich areas; also, the dry blend of resin particles and filler particles carrying the curing agent in the form of a surface film or coating exhibits the long shelf-life at relatively high temperatures and fast curing properties as aforesaid.

For the purposes of the present invention solid type polyfunctional epoxy resins are used, the resins having at least two, and preferably more than two, epoxy gorups.

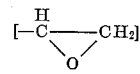

to the molecule, and having a melting point in the range of approximately 130° to 340° F.

An example of a suitable solid polyfunctional epoxy resin for the compositions of invention is an epoxidized novalac type having an idealized structural formula:

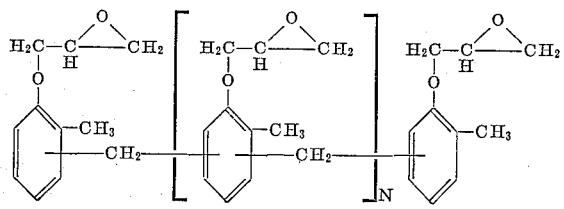

where N is greater than zero.

It should be noted that these resins are mixtures of compounds each having the indicated structure, and where N is an average of the integral numbers of N which characterizes each compound making up the mixtures.

Another example of a solid, polyfunctional epoxy resin suitable for practicing the invention is an epoxidized cresol novalac represented by the idealized structural formula:

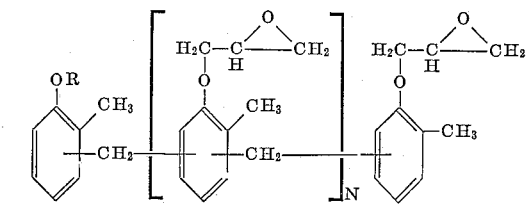

where R represents chlorohydrins, glycols and polymeric ethers, and N is greater than one 1.

Other examples of polyfunctional epoxy resins suitable for use in the compositions of the invention are the polyglycidyl ethers of polyphenols as described in Patent No. 3,001,972.

The curing agents which may be used in the preparation of the molding compositions of the invention preferably are the solid aromatic polyamines having a melting point of approximately 120° to 340° F., examples being meta and para-phenylene diamine, p,p'-methylene dianiline, benzidine and 4,4'-methylene bis(2-chloroaniline). Other curing agents containing active hydrogen, such as aliphatic, alicyclic, and heterocyclic polyamines may be used, provided the melting point is in the range of approximately 120° to 340° F. Furthermore, an adduct or an eutectic may be used, provided their melting points are in the range of approximately 120° to 340° F. A suitable adduct may be prepared by reacting an excess of polyamine with an epoxy resin to form a solid thermoplastic product with active hydrogen groups. A suitable eutectic is a mixture of two or more hardeners of which one or more may have a melting point higher than the melting point of the ultimate mixture, but wherein the mixture has a melting point of approximately 120° to 340° F. as hereinbefore indicated for the curing agent.

The lower melting point, approximately 130° indicated for the polyfunctional epoxy resin, and approximately 120° F. indicated for the curing agent, are required because at storage temperatures these ingredients must remain in a solid state to prevent premature reaction. The epoxy resins exhibit a gradual softening and melting point, whereas the curing agents generally exhibit a sharp melting point. The upper limit of 340° F. is desired because the resin and curing agent must melt or become liquid at the usual molding temperatures of approximately 350° F.

Fillers suitable for inclusion in the molding compositions of the invention are of the usual type; that is, they function primarily to increase viscosity, to lower the coefficient of thermal expansion and to increase thermal conductivity. The common and well-known types to achieve these purposes are powdered minerals, metals, glass, pigments, or mixtures of such fillers. The preferred filler particle size is approximately 325 mesh, and the filler should be in a dry state; examples are silica, slate, alumina, hydrated alumina, mica, calcium carbonate and aluminum powder. The amount of filler may vary from 10 to 300% of the total weight of epoxy resin and curing agent. The flow and molding properties of the compositions are controlled by the amount and type of filler used.

Long flow, that is, where little pressure is required to cause flow in the mold, is obtained with reduced quantities of filler, or with fillers having a low oil absorption level. Long flow molding compositions are desirable for the transfer molding of electronic components such as resistors, transformers and capacitors. Comparatively low molding pressure, in the range of approximately 50 to 500 p.s.i. is desired to prevent breakage of the fine wires of the electronic components.

Short flow molding compositions may be prepared by using comparatively large amounts of fillers, or with fillers which possess a high oil absorption level. Such molding compositions are required for compression molding of parts which have thin wall sections, as for shells used in the encapsulation of electronic components, as described in Patent No. 2,943,359, granted July 5, 1960. Long flow and short flow molding compositions may be made in accordance with the invention.

The molding compositions of the invention may be prepared without the inclusion of accelerators. However, accelerators contribute to fast curing and to the rigidity of the molded product, which aids in ejection from the mold with a minimum of breakage where thin walled sections are involved. The preferred accelerators used in the compositions of the invention are resorcinol, bisphenol A, cathechol, hydroquinone, pyrogallol, and related phenols. The quantity and type of accelerator used effects both the speed of the cure and the volume resistivity of the cured product after exposure to moisture. Furthermore, a relationship exists between the amount of accelerator and the stoichiometric proportions of resin and curing agent. The speed of the cure and the resistance to moisture are affected by these ratios.

Compositions of the invention contain, by weight, approximately 25 to 90% of solid, polyfunctional epoxy resin together with curing agent therefor, 10 to 75% of filler and 0 to 10% of accelerator, it being preferred that the ingredients be present in the amounts of 40 to 70%, 30 to 60% and 1 to 2.5%, respectively.

The molding compositions of the invention are prepared in a novel manner. A usual processing technique comprises milling the ingredients on a two roller mill or mixing in a sigma blade mixer. In accordance with another known procedure, the epoxy resin is dissolved in a solvent, adding the other ingredients, and then flashing off the solvent. In still another method in accordance with the prior art, the resin and curing agent are melted, adding the other ingredients, such as filler, accelerator, etc., and then the melt is cooled.

The molding compositions of the invention, if they were to be prepared in accordance with the foregoing described prior art techniques, would gel during preparation or exhibit poor shelf-life, beginning to set up after only several days when stored at 90° to 100° F. Due to the high level of reactivity of the polyfunctional epoxy resins, particularly when an accelerator is included in the composition to speed the reaction, it is necessary to maintain the resin and curing agent in separate, discrete particle form in order to obtain long storage stability, coupled with fast curing. Nevertheless, when the ingredients of the composition are processed by merely grinding or pulverizing to a fine powder, a lack of uniformity still results in the cured molded product. Hardener-rich and resin-rich areas appear in the cured product, as well as spongy porous areas caused by improperly wetted filler. The high order of reactivity of a molding composition so made results in the molding powder setting up to a hard state before uniform mixing of the resin and curing agent, and thorough wetting of the filler, can be obtained.

When prepared in accordance with the procedure described below, the foregoing difficulties and undesirable results are obviated, and a molding composition is obtained which is extremely rapid curing and provides a uniformly and homogeneously cured product, though the composition may have been stored for an exceptionally long period at temperatures as high as 100° F.

A portion of the filler is dispersed in all of the curing agent for the composition, using a two roller mill or a sigma blade mixer, or by melting the curing agent and mixing in the filler in a heavy-duty mixer. The curing agent may be dissolved in a solvent, the filler mixed in, and the solvent then flashed off. This results in the curing agent being distributed as a surface thin coating or film on the filler particles. Each particle of the filler carries its own curing agent in the form of a film. Each of the filler particles is thus a carrier of a small quantity of curing agent. However, the curing agent, distributed as it is in the form of a thin surface coating or film on the particles, in the aggregate, exposes a very large area of curing agent for ready reaction with the resin particles. The curing agent-filler portion of the composition is now in the form of a cake or agglomerate, which is then pulverized to a fine powder and screened through a 60 mesh or finer screen.

The resin portion of the composition is processed in a similar manner by mixing the balance of the filler and the resin in a two roller mill or sigma blade mixer, or by melting the resin and mixing in a heavy duty mixer. Solvent may be used to dissolve the resin, the filler incorporated, and the solvent subsequently flashed off. In this manner, the remainder of the filler, or that portion which is not carried by the filler particles as aforesaid, is thoroughly wetted by the resin. This resin and filler portion of the composition is then pulverized into a powder and screened through a 60 mesh or finer screen.

The curing agent coated filler portion and the resin coated filler portion are then dry blended together in the desired proportions of between approximately 50% to 110% of stoichiometry.

An accelerator, if used, may be added by also coating filler particles as described above or by addition to the curing agent-filler portion or, simply as a 60 mesh or finer powder, and dry blending with the curing agent-filler and resin-filler portions. Accelerators other than those previously mentioned, such as a boron trifluoride complex, may be used.

A lubricant, such as zinc stearate, calcium stearate or a polyglycol wax is generally added to the molding composition in the ratio of ½% to 2% by weight to prevent sticking of the cured molded part to the mold.

In greater detail, several specific examples of compositions embodying preferred forms of the invention follow.

*Example 1*

| | Parts by weight |
|---|---|
| Epoxidized novalac (epoxy equivalent 190-220) | 100 |
| Hydrated alumina (325 mesh) | 200 |
| Meta-phenylene diamine | 14 |
| Lamp black pigment | 4.5 |
| Zinc stearate | 3 |

Heat the m-phenylene diamine to 200° to 250° F., add 20 parts of the hydrated alumina and mix for 30 minutes. Allow to cool, pulverize, and screen through a 100 mesh screen. Process the epoxidized novalac with the balance of the hydrated alumina and lamp black pigment on a two roller mill. Pulverize and screen through a 100 mesh screen. Then dry blend the two components together with the zinc stearate.

This molding composition may be pressed into preforms or tablets for easy feeding into a mold. The composition is stable at 90° F. for three (3) months and cures in 30 seconds at 300° F. to 340° F. The composition is a short flow composition suitable for compression molding. The volume resistivity of the cured compound is $10^{10}$ ohm-cm. at 200° C.

*Example 2*

| | Parts by weight |
|---|---|
| Epoxidized cresol novalac (epoxy equivalent 225) | 100 |
| Slate flour | 140 |
| p,p'-Methylene dianiline | 20 |
| Bisphenol A powder | 10 |
| Calcium stearate | 3.5 |

Dissolve the p,p'-methylene dianiline in acetone and add 40 parts of the slate flour and mix. Pour into pans and allow the solvent to evaporate, using vacuum to speed the process. A cake is formed which is pulverized and screened through a 100 mesh screen. Process the balance of the filler with the epoxidized cresol novalac in a heavy-duty mixer at a temperature of 250° to 300° F. Pour into pans and cool. Pulverize the cake and screen through a 100 mesh screen. Dry blend the two components together with the bisphenol A and the calcium stearate.

This composition is usable after storing at 90° to 100° F. for three (3) months. The molding composition can be transfer molded in 20 seconds at 300° to 350° F. It becomes rigid in the mold and can be readily ejected without cooling. The volume resistivity at 200° C. is $10^{10}$ ohm-cm. The cured material is unaffected after exposure to acetone for 24 hours.

*Example 3*

| | Parts by weight |
|---|---|
| Epoxidized novalac (epoxy equivalent 190-220) | 100 |
| Glycidyl polyether of bisphenol A (epoxy equivalent 500) | 30 |
| p,p'-Methylene dianiline | 25 |
| Talc | 150 |
| Resorcinol powder | 5 |
| Cadmium red pigment | 3 |

Prepare a polyamine adduct by melting the glycidyl polyether of bisphenol A at 250° to 300° F. in a Hobart mixer, adding the p,p'-methylene dianiline. Mix for 30 minutes and add 50 parts of the talc to the adduct, and continue mixing for 30 minutes. Pour into a pan to cool, then pulverize and screen through a 100 mesh screen.

Process the epoxidized novalac with the balance of the talc and with the cadmium red pigment in a heavy duty mixer at 250° to 300° F. Pour into a pan, cool, then pulverize and screen through a 100 mesh screen. Then, dry blend the two components together with the zinc stearate and resorcinol.

A long flow composition is provided suitable for transfer molding. The composition cures in 45 seconds at 300° to 340° F. Volume resistivity at 175° C. is $10^{10}$ ohm-cm., and the composition is usable after storing for 3 months at 90° to 100° F.

*Example 4*

| | Parts by weight |
|---|---|
| Epoxidized cresol novalac (epoxy equivalent 235) | 100 |
| Meta-phenylene diamine | 10 |
| Slate flour | 120 |
| Catechol | 3 |
| Zinc stearate | 3 |

Melt the meta-phenylene diamine at 200° F., add 20 parts of the slate flour, and mix for 30 minutes in a heavy duty mixer. Cool, pulverize and screen through a 100 mesh screen. Process the balance of the filler with the resin at 250 to 300° F. Cool, pulverize and screen through a 100 mesh screen. Then, dry blend the two components together with the cathechol and zinc stearate.

This molding composition is useable after storing for 3 months at 90° to 100° F. It is suitable for transfer molding and will cure in 15 seconds at 300° to 340° F.

While in the specific examples of preferred compositions set forth above a portion of the component's filler is mixed or processed with the resin, it will be understood that the entire amount of the filler ingredient of the composition may serve as the carrier for the curing agent. If the composition has a relatively small amount of filler with relation to the total amount of the molding composition of which it is an ingredient, then the entire amount of the filler may be surface coated with the curing agent as aforesaid.

It is believed that the advantages and improved results of the invention will be apparent from the foregoing detailed description of several preferred embodiments thereof. It will be understood that various modifications and changes may be made without departing from the spirit and scope of the invention as sought to be defined in the following claims.

I claim:

1. A dry blend composition comprising particles containing a solid polyfunctional epoxy resin having more than two (2) epoxy groups per molecule and a melting point of approximately 130 to 340° F. in intimate mixture with filler particles, the filler particles being individually coated with a surface film of a curing agent to furnish a substantial surface area of curing agent for reaction with the resin at molding temperatures, substantially all of the curing agent of the composition being carried on filler particles, the curing agent coated filler particles having a size not more than approximately 60 mesh, the curing agent having a melting point of approximately 120 to 340° F.

2. A composition as set forth in claim 1, wherein the solid polyfunctional epoxy resin having more than two (2) epoxy groups per molecule is selected from the group consisting of epoxidized novalacs and polyglycidyl ethers of polyphenols.

3. A composition as set forth in claim 1, wherein the curing agent having a melting point of approximately 120 to 340° F. is selected from the group consisting of polyamines, adducts of polyamines and epoxy resins, and mixtures of polyamines.

4. A composition as set forth in claim 1, wherein the composition contains an accelerator; wherein the solid polyfunctional resin having more than two (2) epoxy resin groups per molecule is selected from the group consisting of epoxidized novalacs and polyglycidyl ethers of polyphenols; wherein the curing agent having a melting point of approximately 120 to 340° F. is selected from the group consisting of polyamines, adducts of polyamines and epoxy resins, and mixtures of polyamines and wherein the composition contains, by weight, approximately 40 to 70% of resin together with the curing agent therefor, approximately 30 to 60% of filler, and approximately 1 to 2.5% of accelerator.

5. A composition comprising an epoxy resin, a curing agent and filler particles, the resin being a solid polyfunctional epoxy resin having more than two (2) epoxy groups per molecule and having a melting point of approximately 130 to 340° F. and the curing agent having a melting point of approximately 120 to 340° F., a portion of the composition's filler particles being individually coated with a surface film of the curing agent to furnish a substantial surface area of curing agent for reaction with the resin at molding temperatures, substantially all of the curing agent of the composition being carried on said filler particles, the curing agent coated filler particles having a size not more than approximately 60 mesh, the remainder of the filler particles being coated with the resin, the curing agent coated filler portion and the resin coated filler portion being dry blended in intimate mixture in the proportions of approximately 50 to 110% of stoichiometry.

6. A composition as set forth in claim 5, wherein the solid polyfunctional epoxy resin having more than two (2) epoxy groups per molecule is selected from the group consisting of epoxidized novalacs and polyglycidyl ethers of polyphenols.

7. A composition as set forth in claim 5, wherein the curing agent having a melting point of approximately 120 to 340° F. is selected from the group consisting of polyamines, adducts of polyamines and epoxy resins, and mixtures of polyamines.

8. A composition as set forth in claim 5, wherein the composition contains an accelerator; wherein the solid polyfunctional epoxy resin having more than two (2) epoxy resin groups per molecule is selected from the group consisting of epoxidized novalacs and polyglycidyl ethers of polyphenols; wherein the curing agent having a melting point of approximately 120 to 340° F. is selected from the group consisting of polyamines, adducts of polyamines and epoxy resins, and mixtures of polyamines; and wherein the composition contains, by weight, approximately 40 to 70% of resin together with the curing agent therefor, approximately 30 to 60% of filler, and approximately 1 to 2.5% of accelerator.

9. A method of making a fast curing dry blend composition of epoxy resin, curing agent and filler having long shelf-life at temperatures as high as approximately 100° F., and which upon molding provides a homogeneous product free of curing agent-rich and resin-rich areas, said resin being a solid polyfunctional epoxy resin having more than two (2) epoxy groups per molecule, said method comprising coating at least a portion of the composition's filler particles with the curing agent so that the filler particles are individually coated with a surface film of the curing agent to furnish a substantial surface area of curing agent for reaction with the resin at molding temperatures, substantially all of the curing agent of the composition being carried on filler particles, the curing agent coated filler particles having a size not more than approximately 60 mesh, and dry blending together the curing agent coated filler particles and particles containing the resin in solid form.

10. A method as set forth in claim 9, wherein the solid polyfunctional epoxy resin having more than two (2) epoxy groups per molecule is selected from the group consisting of epoxidized novalacs and polyglycidyl ethers of polyphenols.

11. A method as set forth in claim 9, wherein the curing agent has a melting point of approximately 120 to 340° F. and is selected from the group consisting of polyamines, adducts of polyamines and epoxy resins, and mixtures of polyamines.

12. A method as set forth in claim 9, wherein the composition contains an accelerator; wherein the solid polyfunctional epoxy resin having more than two (2) epoxy resin groups per molecule is selected from the group consisting of epoxidized novalacs and polyglycidyl ethers of polyphenols; wherein the curing agent has a melting point of approximately 120 to 340° F. and is selected from the group consisting of polyamines, adducts of polyamines and epoxy resins, and mixtures of polyamines; and wherein the composition contains, by weight, approximately 40 to 70% of resin together with the curing agent therefor, approximately 30 to 60% of filler, and approximately 1 to 2.5% of accelerator.

13. A method of making a fast curing dry blend composition of epoxy resin, curing agent and filler having long shelf-life at temperatures as high as approximately 100° F., and which upon molding provides a homogeneous product free of curing agent-rich and resin-rich area, said resin being a solid polyfunctional epoxy resin having more than two (2) epoxy groups per molecule, said method comprising coating a portion of the composition's filler particles with the curing agent for the composition so that the filler particles are individually coated with a surface film of the curing agent to furnish a substantial surface area of curing agent for reaction with the resin at molding temperatures, substantially all of the curing agent of the composition being carried on said portion of filler particles, said curing agent coated filler particles having a size not more than approximately 60 mesh, coating the remaining portion of the filler particles with the resin, the curing agent coated filler portion and the resin coated filler portion being in powder form, and dry blending together the curing agent coated filler portion and the resin coated filler portion.

14. A method as set forth in claim 13, wherein the solid polyfunctional epoxy resin having more than two (2) epoxy groups per molecule is selected from the group consisting of epoxidized novalacs and polyglycidyl ethers of polyphenols.

15. A method as set forth in claim 13, wherein the curing agent has a melting point of approximately 120 to 340° F. and is selected from the group consisting of polyamines, adducts of polyamines and epoxy resins, and mixtures of polyamines.

16. A method as set forth in claim 13, wherein the composition contains an accelerator; wherein the polyfunctional epoxy resin having more than two (2) epoxy resin groups per molecule is selected from the group consisting of epoxidized novalacs and polyglycidyl ethers of polyphenols; wherein the curing agent has a melting point of approximately 120 to 340° F. and is selected from the group consisting of polyamines, adducts of polyamines and epoxy resins, and mixtures of polyamines; and wherein the composition contains, by weight, approximately 40 to 70% of resin together with the curing agent therefor, approximately 30 to 50% of filler and approximately 1 to 2.5% of accelerator.

(References on following page)

References Cited by the Examiner

UNITED STATES PATENTS

| | | |
|---|---|---|
| 2,773,048 | 12/1956 | Formo et al. |
| 2,801,229 | 7/1957 | De Hoff et al. |
| 2,866,768 | 12/1958 | Bolstad. |
| 3,000,750 | 9/1961 | Felletschin. |

OTHER REFERENCES

Lee et al.: "Epoxy Resins," McGraw-Hill, 1957 (p. 15 relied on).

MORRIS LIEBMAN, *Primary Examiner.*

A. H. KOECKERT, *Assistant Examiner.*